UNITED STATES PATENT OFFICE.

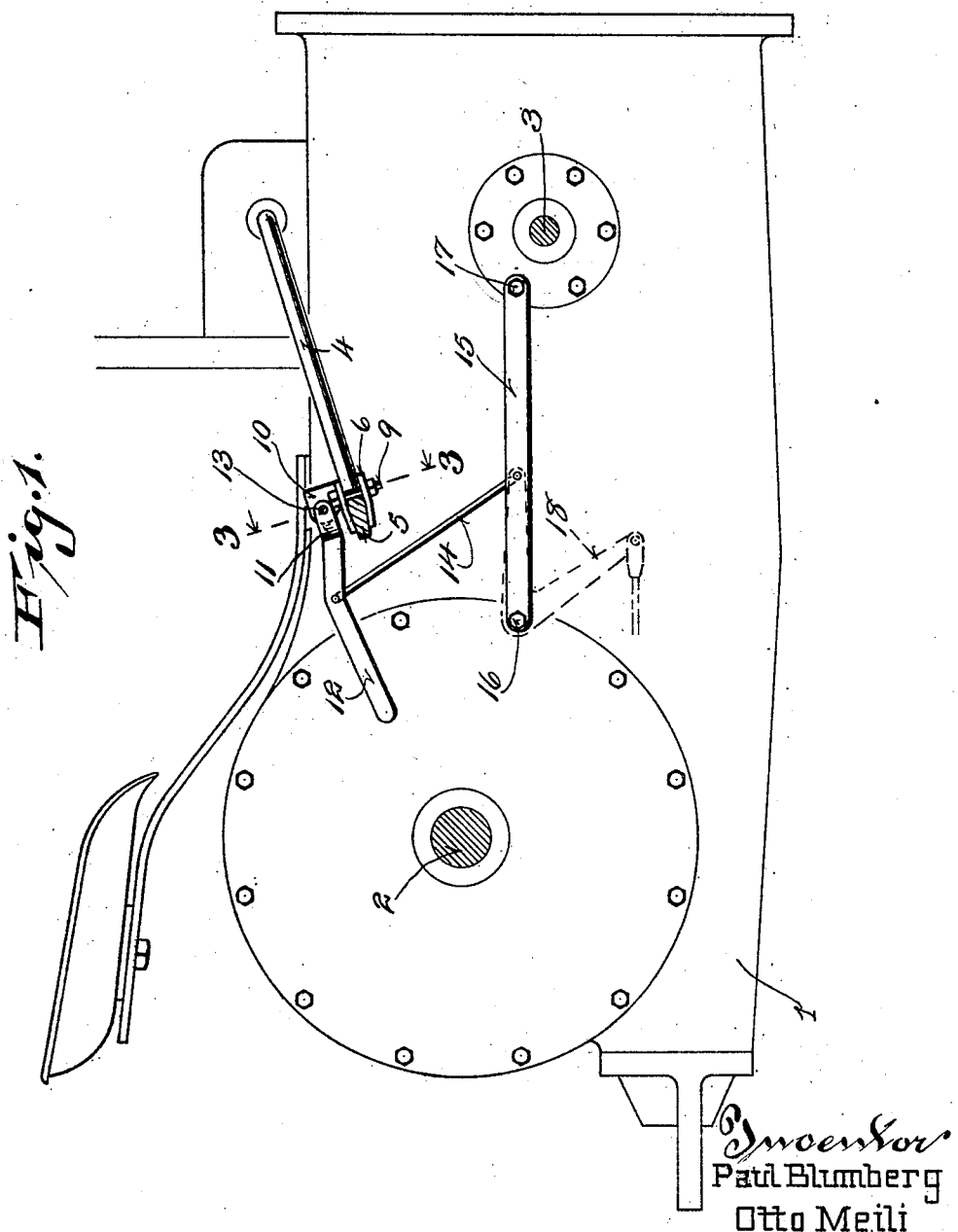

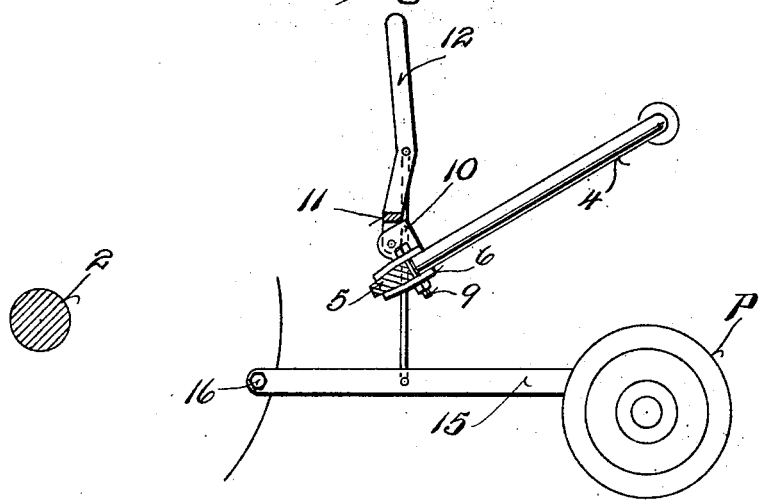
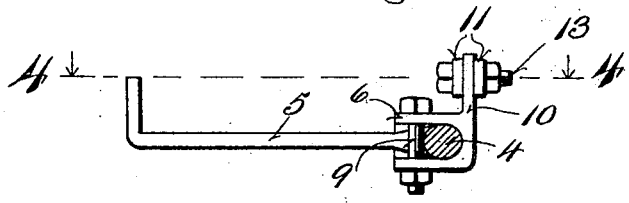
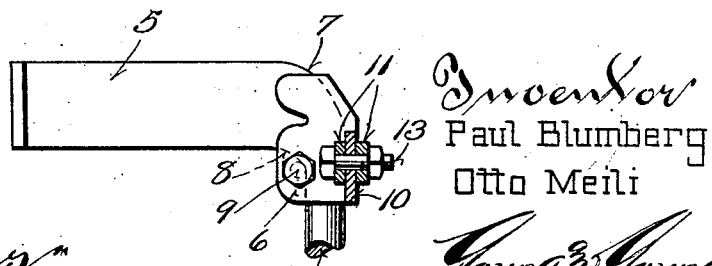

PAUL BLUMBERG AND OTTO MEILI, OF NEW HOLSTEIN, WISCONSIN.

TRACTOR-CLUTCH CONTROL.

1,381,104.  Specification of Letters Patent.  Patented June 14, 1921.

Application filed October 11, 1920. Serial No. 416,231.

*To all whom it may concern:*

Be it known that we, PAUL BLUMBERG and OTTO MEILI, both citizens of the United States, and residents of New Holstein, in the county of Calumet and State of Wisconsin, have invented certain new and useful Improvements in Tractor-Clutch Controls; and we do hereby declare that the following is a full, clear, and exact description thereof.

Our invention pertains to new and useful improvements in attachments for the controlling means of motor tractors.

As such tractors are at present constructed, more if not all of them, have the clutch between the power plant and the transmission mechanism so arranged that it will be automatically shifted to operative position, and consequently must be manually moved to inoperative position. Furthermore no adequate means is supplied with such structures to hold the clutch in inoperative position, and this is a disadvantage, especially when the power of the tractor is being utilized for driving farm machinery as feed cutters, buzz saws and the like. Therefore it is the primary object of this invention to provide a tractor clutch control whereby the clutch lever may be retained in either its operative on its inoperative position at the will of the operator.

A further object of the invention is to provide a clutch control device of this character which can be quickly and easily shifted into or out of either one of its two main positions.

Another object of the invention is to provide a tractor clutch control which can be used both when the tractor is employed as a stationary source of power for farm machinery and the like, and when used as a draft machine for pulling such implements as plows.

With these general objects in view, the invention consists in the novel features of construction, combination and arrangement of parts which will be hereinafter more particularly described and claimed, as shown in the accompanying drawings wherein,—

Figure 1 represents a side elevational view, partly in section, of the rear end portion of a convenient type of tractor showing the manner of applying a power clutch control device thereto.

Fig. 2 is an elevational view, partly in section, of the control mechanism shown in position for holding the clutch rod in inoperative position.

Fig. 3 is a transverse vertical section taken substantially on the plane of the line 3—3 of Fig. 1, and, Fig. 4 is a section on the plane of the line 4—4 of Fig. 3.

Referring more particularly to the drawings, it will be seen that the reference character 1 denotes the rear or transmission portion of a standard type of tractor, the same including a drive wheel shaft 2 and a pulley shaft 3. In this form of tractor the clutch for controlling the connection between the power plant and the transmission mechanism is operated by a clutch rod 4 having a foot pedal 5, this clutch rod being normally retained in elevated position and the clutch in operative position by suitable springs as is customary in mechanisms of this character. Therefore to release the parts of the clutch from operative engagement, it is necessary to depress the clutch rod and pedal, this being accomplished by the driver who is seated above the drive wheel shaft in the place provided for this purpose as shown in Fig. 1.

The invention comprises a lever bracket 6 which is substantially U-shaped in cross section and is designed to straddle the clutch rod 4 and foot pedal 5 at the junction of these two parts. The pedal 5 being extended substantially at right angles to the rod 4 and the junction thereof being curved as at 7 and 8, the bight portion of the lever bracket 6 is shaped to conform to the contour of the curve 7 as is most clearly indicated in Fig. 4. Thus by inserting a wing bolt 9 through the arm portions of the lever bracket 6 and engaging the intermediate portion of the shank thereof with the curve 8, said bracket is effectively and rigidly secured on the clutch rod and foot pedal.

The upper side of the lever bracket 6 has an upstanding ear 10 which is straddled by the bifurcated end 11 of a lever 12, a bolt or pivot pin 13 being extended through the furcations of the end 11 and the ear 10 to pivot said lever 12 to the latter. Movement of this lever about its pivot formed by the bolt 13 is limited through the engagement of a portion of the bifurcated end 11 with the ear 10 when swung in one direction and with another portion of the bracket 6 when swung in a reversed direction.

The lever 12 is slightly bent and at the bend is formed a pivot hole for the reception of one end of a link 14, the other end thereof being journaled in a fixed bar 15, or other stationary or suitable part of the tractor. When the bar 15 is used its opposite ends are secured respectively to the cover plates of the wheel drive mechanism and the pulley drive mechanism by bolts 16 and 17. This fixed bar 15 is used particularly when our improved clutch control device is to be used for operating the drive for the pulley P, for instance the parts of the device are arranged as shown in Fig. 1 when the pulley is to be rotated, and positioned as in Fig. 2 when the pulley is idle. On the other hand the link 14 can also be attached to the ball crank 18 of such a draft mechanism as is illustrated in our co-pending application, Serial No. 333786, filed October 27, 1919, or any other preferred draft connection.

From the foregoing description taken in connection with the accompanying drawings, it is obvious that we have devised a very simply constructed attachment whereby the clutch rod of a tractor can be easily and quickly controlled, it being possible through the use of this arrangement to hold the clutch rod in either one of its two normal positions. The simplicity of construction of our attachment not only allows it to quickly and easily secure to a clutch rod and foot pedal therefor, but as a result it may be inexpensively manufactured.

We claim:

1. The combination with a control lever, of means for holding the control lever in either one of two positions, comprising a member pivoted to the lever, said member being disposed on one side of the center line of its fulcrum when the lever is in one position and on the opposite side when the latter is in its other position.

2. The combination with a control lever, of an attaching bracket secured to said lever, a handle fulcrumed to said bracket, and a retaining means connected with the handle, said handle being movable to locate the point of connection of the maintaining means therewith on either side of the center line of the handle fulcrum whereby to dispose the lever in either one of two positions.

3. The combination with a control lever having substantially straight main portion and a pedal projecting laterally from the main portion, of an attaching bracket comprising a channel member straddling the lever at the junction of the main portion and pedal, a bolt extended through the flanges of the member of said junction, and a handle pivoted to the bracket, said handle being attached to selectively hold the control lever in either one of its two positions.

In testimony that we claim the foregoing we have hereunto set our hands at New Holstein, in the county of Calumet and State of Wisconsin.

PAUL BLUMBERG.
OTTO MEILI.